United States Patent [19]

Rabe

[11] Patent Number: 4,723,645
[45] Date of Patent: * Feb. 9, 1988

[54] POLYMERIC CAGE FOR OVERRUNNING CLUTCH

[75] Inventor: Jürgen Rabe, Aurachtal, Fed. Rep. of Germany

[73] Assignee: INA Walzlager Schaeffler KG, Fed. Rep. of Germany

[*] Notice: The portion of the term of this patent subsequent to Nov. 4, 2003 has been disclaimed.

[21] Appl. No.: 888,886

[22] Filed: Jul. 23, 1986

[30] Foreign Application Priority Data

Aug. 1, 1985 [DE] Fed. Rep. of Germany ....... 3527598

[51] Int. Cl.⁴ .................. F16D 41/07; F16D 15/00
[52] U.S. Cl. .......................... 192/45; 384/576
[58] Field of Search ................. 192/45, 41 A; 188/82.84; 384/576

[56] References Cited

U.S. PATENT DOCUMENTS

| | | | |
|---|---|---|---|
| 3,387,901 | 6/1968 | Williams | 384/576 |
| 3,537,554 | 11/1970 | Elmore et al. | 192/45 |
| 3,760,914 | 9/1973 | Gelbrich | 192/45 |
| 3,881,790 | 5/1975 | Ryanen | 384/576 |
| 3,917,036 | 11/1975 | Johnson et al. | 192/45 |
| 3,937,312 | 2/1976 | Gehrke | 192/45 |
| 3,944,307 | 3/1976 | Bingle | 384/576 |
| 4,054,340 | 10/1977 | Broshkevitch et al. | 384/576 |
| 4,155,606 | 5/1979 | Kispert et al. | 384/576 |
| 4,327,822 | 5/1982 | Vogele et al. | 192/41 A |
| 4,620,806 | 11/1986 | Rabe | 192/45 X |

FOREIGN PATENT DOCUMENTS

| | | |
|---|---|---|
| 1264886 | 9/1970 | Fed. Rep. of Germany . |
| 3434499 | 3/1986 | Fed. Rep. of Germany ... 192/41 A |
| 660399 | 11/1951 | United Kingdom ............. 384/576 |

Primary Examiner—Rodney H. Bonck
Attorney, Agent, or Firm—Bierman & Muserlian

[57] ABSTRACT

A polymeric cage for cam rollers in an overrunning clutch comprising an end ring connected to a plurality of crossbars defining roller pockets axially open on one side and leaf spring elements integrally on the crossbars for acting on the cam rollers, the spring element (4) at the outer wall surface of the crossbar extends outside the adjacent pocket in its unassembled state and becomes bent substantially radially inwardly during insertion of the roller whereby it is bent inwardly after insertion of cam roller (6).

7 Claims, 3 Drawing Figures

4,723,645

POLYMERIC CAGE FOR OVERRUNNING CLUTCH

STATE OF THE ART

DE PS No. 1,264,886 describes a polymeric cage for an overrunning clutch for cam rollers which is produced in an axially divisible mold without radially acting slides. However, there is a connection between the spring element and the end face of the end ring limiting the associated pocket which has the disadvantage that the spring element cannot uniformly flex over its width so that the cam roller is tilted and the clutch malfunctions. This disadvantage can only be avoided if a complicated mold is used for the production of the cage in which radially acting slides which engage between the spring element and the end face of the end ring limiting the associated pocket and which at that pocket a connection between the two parts by formation of an interstice is used.

OBJECTS OF THE INVENTION

It is an object of the invention to provide a novel polymeric cage for overrunning clutches which avoids the prior art problems and can be produced in an axially divisible mold without radially acting slides.

This and other objects and advantages of the invention will become obvious from the following detailed description.

THE INVENTION

The novel polymeric cage of the invention for cam rollers in an overrunning clutch is comprised of an end ring connected to a plurality of crossbars defining roller pockets axially open on one side and leaf spring elements integrally on the crossbars for acting on the cam rollers, the spring element (4) at the outer wall surface of the crossbar extends outside the adjacent pocket in its unassembled state and becomes bent substantially radially inwardly during insertion of the roller after insertion of cam roller (6)

The prior art problem is solved since each crossbar has at its outer wall surface a spring element which in the unassembled state extends outside the associated pocket and when the cam roller is inserted is bent over substantially radially inwardly. By this arrangement of the spring element and by the fact that in this unassembled state it is outside the associated pocket, a connection between the spring element and the end face of the end ring limiting the pocket is avoided. At the same time the cage can be produced in an axially divisible mold without radially acting slides since the spring element extending outside the associated pocket does not form any undercut that would hinder axial removal of the cage from the mold.

For varying the spring constant, the spring element may alternatively extend over only a partial region of the crossbar length. For better utilization of the existing structural space in radial direction for as large as possible a crossbar crosssection area, the spring element may originate from that outer edge of the crossbar which is adjacent to the pocket in which the spring element acts.

In another embodiment of the invention, the lateral face of the crossbar facing the pocket in which the spring element acts may have a cutout in its entire radially outer region. By this measure, the point of engagement of the spring element is removed from the pocket by the depth of the cutout and thus a greater spring length is obtained. The radial extent of the cutout should be dimensioned so that the bent-over spring element cannot come in contact with the outer edge of the offset of the crossbar formed by the cutout.

A further embodiment of the invention provides that the lateral face of the crossbar adjacent to the spring element is provided near the spring element with a fillet extending in the axial direction. This should extend at least over the total spring element width as it serves to improve the elastic deformation behavior of the crossbar region at the point of engagement of the spring element and to permit, if possible, a more than rectangular bending-over of the spring element.

According to a last embodiment of the invention, the spring element has, in its region in contact with the cam roller when the latter is inserted, an axially extending cutout which has a substantially arc-shaped contour adapted to the radius of the cam roller which cutout serves to improve the retention of the cam roller in the pocket.

Referring to the drawings.

Figure 1:
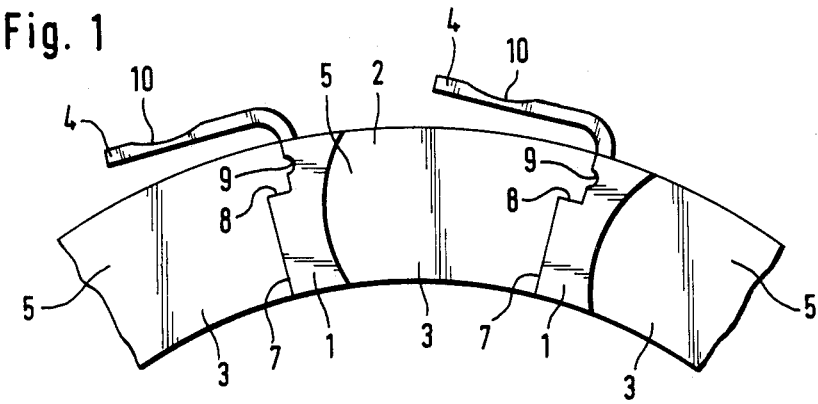
FIG. 1 is a partial end view of a cage of the invention in its unassembled state.
Figure 2:
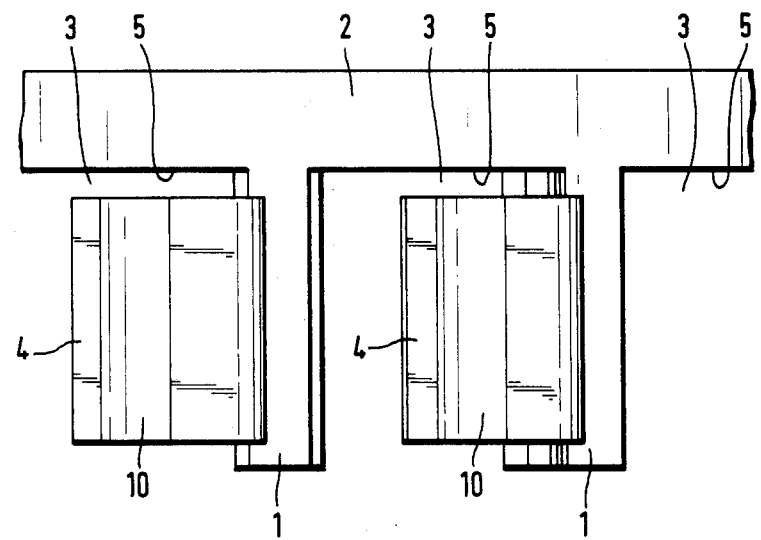
FIG. 2 is a partial top view of the cage of FIG. 1.

In the cage illustrated in FIGS. 1 and 2, crossbars (1) and end ring (2) define pockets (3) axially open on one side to receive the cam rollers and each crossbar (1) is provided at its one outer edge with at least one spring element (4) which extends outside the associated pocket 3. Due to this measure, the cage presents no undercuts of any kind that could hinder axial removal from the mold so that cage can be produced in an axially divisible injection mold without radially acting slides.

As can be seen from FIG. 2, since the spring element (4) extends only over a part of the length of crossbar (1), there is no connection of the spring element (4) with the end face (5) of the end ring (2) limiting the pocket (3) whereby the spring 25 element (4) can flex uniformly over its entire width and tilting of the cam rollers can thus not occur.

A disadvantageous connection between the spring element (4) and the end face (5) of the end ring (2) is also impossible when the spring element (4) extends over the total length of crossbar (1), differently than illustrated in the figures, since due to the fact that the spring element (4) extends outside the pocket (3), such a connection cannot be established at all.

Figure 3:
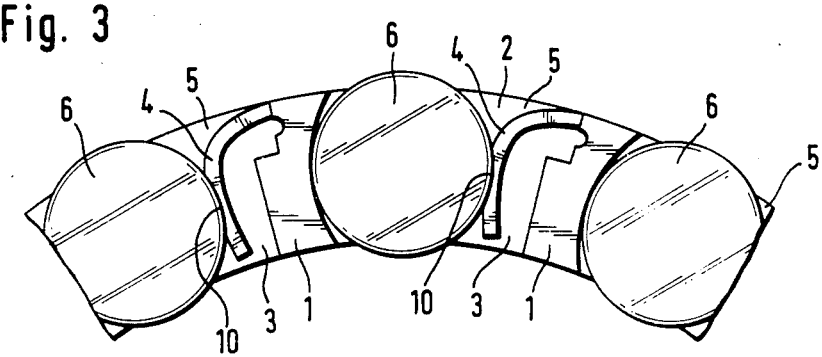
FIG. 3 is a partial end view of the cage of FIG. 1 with the cam rollers inserted therein.

As can be seen from FIG. 3 spring element (4) is bent over radially inward into the pocket (3) as the cam roller (6) is being inserted therein. In its radially outer region, the side face (7) of the crossbar is provided with cutout (8) which has in its face adjacent to the spring element (4), fillet (9). The cutout (8) serves to enlarge the attainable spring length and the fillet (9) improves the bending behavior of the spring element (4) at its point of engagement.

In addition, the spring element (4) has in its region in contact with the cam roller (6) when the latter is inserted, as can be seen from FIG. 2, an axially extending cutout (10) which has an arc-shaped contour adapted to the radius of the cam roller (6) which serves to improve the retention of the cam roller (6) in the pocket (3).

Various modifications of the cage of the invention may be made without departing from the spirit or scope thereof and it is to be understood that the invention is intended to be limited only as defined in the appended claims.

What is claimed is:

1. A polymeric cage for cam rollers in an overrunning clutch comprising an end ring connected to a plurality of crossbars defining roller pockets axially open on one side and leaf spring elements integrally on the crossbars for acting on the cam rollers, the spring element (4) at the outer wall surface of the crossbar extends outside the adjacent pocket in its unassembled state and becomes bent substantially radially inwardly during insertion of the roller whereby it is bent inwardly after insertion of cam roller (6).

2. The cage of claim 1 wherein the spring element (4) extends only over a partial portion of the crossbar length 3. The cage of claim 1 wherein the spring element (4) originates from the outer edge of cross bar (1) adjacent to the pocket (3) in which the spring element (4) acts.

4. The cage of claim 2 wherein the spring eement (4) originates from the outer edge of crossbar (1) adjacent to the pocket (3) in which the spring element (4) acts.

5. The cage of claim 3 wherein the lateral face (7) of the crossbar (1) turned towards the pocket (3) in which the spring element (4) acts is provided with a cutout (8) in its totally radially outer region.

6. The cage of claim 3 wherein the lateral face of the crossbar (1) adjacent to the spring element (4) is provided with a fillet (9) near the spring element which fillet (9) extends in the axial direction.

7. The cage of claim 1 wherein the spring element (4) is provided with an axially extending cutout (10) in its region in contact with the cam roller, the cutout (10) having an arc-shaped contour adapted to the radius of the cam roller (6).

* * * * *